US011098827B2

(12) United States Patent
Nishijima et al.

(10) Patent No.: US 11,098,827 B2
(45) Date of Patent: Aug. 24, 2021

(54) TUBULAR STRUCTURE AND MANUFACTURING METHOD THEREFOR

(71) Applicant: NIPPON STEEL CORPORATION, Tokyo (JP)

(72) Inventors: Shinnosuke Nishijima, Tokyo (JP); Kouki Tomimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 251 days.

(21) Appl. No.: 15/771,667

(22) PCT Filed: Jan. 29, 2016

(86) PCT No.: PCT/JP2016/052799
§ 371 (c)(1),
(2) Date: Apr. 27, 2018

(87) PCT Pub. No.: WO2017/073088
PCT Pub. Date: May 4, 2017

(65) Prior Publication Data
US 2019/0078710 A1   Mar. 14, 2019

(30) Foreign Application Priority Data
Oct. 27, 2015   (JP) .............................. JP2015-211038

(51) Int. Cl.
*F16L 23/08*   (2006.01)
*B21D 17/04*   (2006.01)
(Continued)

(52) U.S. Cl.
CPC .............. *F16L 23/08* (2013.01); *B21D 17/04* (2013.01); *B21H 1/18* (2013.01); *F16L 17/04* (2013.01); *F16L 21/08* (2013.01); *F16L 21/065* (2013.01)

(58) Field of Classification Search
CPC . F16L 23/08; F16L 21/08; F16L 17/04; F16L 21/065; B21H 1/18; B21D 17/04
(Continued)

(56) References Cited

U.S. PATENT DOCUMENTS 2,067,428 A * 1/1937 Wallis ..................... F16L 17/04
137/505.25
2,497,441 A * 2/1950 Detweiler ............. F16L 19/028
285/233
(Continued)

FOREIGN PATENT DOCUMENTS

| CN | 1955533 A | 5/2007 |
| CN | 103925431 A | 7/2014 |

(Continued)

OTHER PUBLICATIONS

International Search Report corresponding to Application No. PCT/JP2016/052799; dated Mar. 29, 2016.
(Continued)

*Primary Examiner* — James M Hewitt, II
(74) *Attorney, Agent, or Firm* — Birch, Stewart, Kolasch & Birch, LLP

(57) ABSTRACT

A tubular structure includes a tube member provided with annular protrusions, on a side of an insertion opening that is a tube end part or a receiving opening and, on an outer circumference of the tube member, ring members, arranged on an opposite side of the tube end part with respect to the annular protrusions, having two side surfaces that are vertical with respect to an axis of the tube member.

4 Claims, 6 Drawing Sheets

(51) Int. Cl.
*F16L 17/04* (2006.01)
*B21H 1/18* (2006.01)
*F16L 21/08* (2006.01)
*F16L 21/06* (2006.01)

(58) Field of Classification Search
USPC ............................................... 285/233
See application file for complete search history.

(56) References Cited

U.S. PATENT DOCUMENTS

| | | | | |
|---|---|---|---|---|
| 2,781,207 | A * | 2/1957 | Detweiler | F16L 27/1136 285/233 |
| 2,826,437 | A * | 3/1958 | Detweiler | F16L 27/1136 285/233 |
| 2,971,781 | A * | 2/1961 | Torres | F16L 19/028 285/233 |
| 3,154,328 | A * | 10/1964 | Masse | F16L 19/0206 285/233 |
| 3,223,438 | A * | 12/1965 | De Cenzo | F16L 19/0218 285/233 |
| 3,370,870 | A * | 2/1968 | Mahoff | F16L 27/12 285/233 |
| 3,405,957 | A * | 10/1968 | Chakroff | F16L 27/1136 285/93 |
| 3,669,472 | A * | 6/1972 | Nadsady | F16L 27/1136 285/87 |
| 4,436,326 | A * | 3/1984 | Peaster | F16L 27/00 285/148.27 |
| 4,503,680 | A * | 3/1985 | Wood | F01D 25/243 285/233 |
| 5,131,689 | A * | 7/1992 | Bates | F16L 27/06 285/233 |
| 5,584,512 | A * | 12/1996 | Carstensen | F16L 1/18 285/55 |
| 6,068,303 | A * | 5/2000 | Hollnagle | F16L 35/00 285/233 |
| 2005/0253380 | A1 * | 11/2005 | Gibb | F16L 25/14 285/111 |
| 2005/0253381 | A1 | 11/2005 | Gibb et al. | |
| 2009/0072536 | A1 | 3/2009 | Katsura | |
| 2016/0288187 | A1 | 10/2016 | Nishijima et al. | |
| 2017/0328500 | A1 * | 11/2017 | Bowman | F16L 23/08 |

FOREIGN PATENT DOCUMENTS

| | | | | |
|---|---|---|---|---|
| CN | 104565583 | A | | 4/2015 |
| CN | 204554155 | U | | 8/2015 |
| GB | 1322269 | A | * 7/1973 | ............. F16L 25/14 |
| JP | 60121587 | U1 | | 8/1985 |
| JP | 07180787 | A | | 7/1995 |
| JP | 2000179769 | A | | 6/2000 |
| JP | 3436864 | A | | 8/2003 |
| JP | 2004347045 | A | | 12/2004 |
| JP | 2007225094 | A | | 9/2007 |
| JP | 3171067 | U | | 9/2011 |
| JP | 3171690 | U | | 11/2011 |
| JP | 5727663 | B1 | | 6/2015 |
| TW | 461945 | A | | 11/2001 |
| TW | I424128 | B | | 1/2014 |

OTHER PUBLICATIONS

EPO Office Action issued to EP Patent Application No. 16859326.7, dated May 9, 2019.
Office Action issued to TW Patent Application No. 105108694, dated Apr. 2, 2019.
Extended European Search Report corresponding to Application No. 16859326.7-1010/3369979 PCT/JP2016052799; dated Oct. 9, 2018.
Office Action issued in the CN Patent Application No. CN201680064069.8, dated Dec. 17, 2019.
CNIPA Office Action for corresponding CN Application No. 201680064069.8; dated Jun. 11, 2020.

* cited by examiner

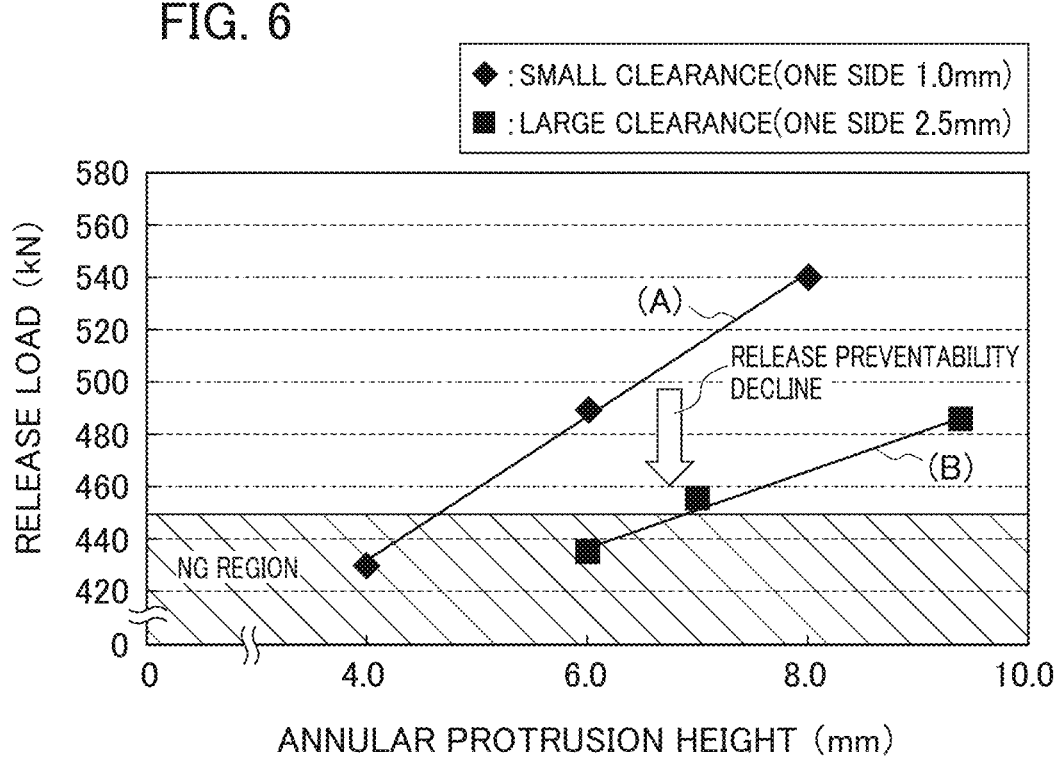

TUBULAR STRUCTURE AND MANUFACTURING METHOD THEREFOR

CROSS REFERENCE TO RELATED APPLICATIONS

This is the U.S. national stage of application No. PCT/JP2016/052799, filed on Jan. 29, 2016. Priority under 35 U.S.C. § 119(a) and 35 U.S.C. § 365(b) is claimed from Japanese Application No. 2015-211038, filed on Oct. 27, 2015, the disclosure of which is also incorporated herein by reference.

TECHNICAL FIELD

The present invention relates to a tubular structure and a manufacturing method therefor.

BACKGROUND ART

In the related art, ductile cast iron pipes are widely used as a tubular structure for water piping and so on. The ductile cast iron pipes are made of casting, and thus have a high degree of freedom in terms of shape. Accordingly, there are a wide variety of joints and the joints are used in the right places.

In the meantime, tubular structures for water piping and so on also include stainless steel (SUS). However, SUS tubes have certain limited applications as processing the joints are not easy. Still, SUS tubes have the following advantages. SUS pipes are longer in service life than ductile cast iron pipes. SUS pipes are less prone to problems such as red water and blue water and cause no stress corrosion cracking under a normal temperature environment, and thus are low in running cost. Accordingly, the use of SUS tubes for various applications from now on is being demanded.

Tubular structures made of SUS as described above are interconnected by the tube end portions of two tubular structures facing each other and a housing being disposed on the outer peripheries thereof.

Annular protrusions are disposed at the tube end parts of the tubular structures. Two or more annular grooves are formed in the inner peripheral surface of the housing. When the housing is attached to the outer peripheries of the tubular structures, the annular protrusions of the two tubular structures to be interconnected are put into two of the annular grooves, respectively. Then, the housing is fixed to the tubular structures. As a result, the two tubular structures are interconnected (refer to Patent Document 1).

However, in general, the housing is manufactured by casting. Casting entails a low level of dimensional accuracy, and thus results in a large clearance between the housing and the tubular structure in some cases. Once the clearance becomes large, the tubular structures interconnected by the housing are likely to be removed.

Disclosed in this regard is a structure in which a ring for a stopper is disposed between the housing and the tubular structure (refer to Patent Document 2).

According to this related art, the variations of the housing in terms of dimensional accuracy can be compensated for by the ring for a stopper even in a case where the clearance between the housing and the tubular structure is large.

Patent Document 1: Japanese Patent No. 5727663
Patent Document 2: Japanese Utility Model registration No. 3171067

DISCLOSURE OF THE INVENTION

Problems to be Solved by the Invention

In the related art that is disclosed in Patent Document 2, the ring for a stopper is equal in axial-direction length to the annular groove in the housing into which the ring for a stopper is inserted. The annular protrusion of the tubular structure is fitted tightly into a groove formed in the inner peripheral surface of the ring for a stopper. Accordingly, the housing and the tubular structure are fixed in an axial direction. Therefore, the length-direction shaking of the tubular structure is unlikely to be absorbed in a case where, for example, shaking occurs during an earthquake or the like.

An object of the present invention is to provide a tubular structure and a manufacturing method therefor that allow tube removal to be prevented even in a case where the clearance between a housing and the tubular structure is large and also allow length-direction vibration to be absorbed to some extent.

Means for Solving the Problems

A first aspect of the present invention relates to a tubular structure including a tubular member provided with annular protrusions on tube end portions and a ring member disposed on a side opposite to the tube end portion with respect to the annular protrusion on an outer periphery of the tubular member and having two side surfaces perpendicular to an axis of the tubular member.

Preferably, one of the tube end portions of the tubular member is an insertion opening and the other tube end portion of the tubular member is a receiving opening larger in diameter than the insertion opening and the annular protrusion and the ring member are disposed on at least one of the insertion opening side and the receiving opening side.

Preferably, the tubular structure is connectable by a housing having a groove into which the annular protrusion is inserted in an inner peripheral surface and a height of the ring member exceeds a maximum clearance between an outer peripheral surface of the tubular member and the inner peripheral surface of the housing and is less than a distance between the outer peripheral surface of the tubular member and a bottom surface of the groove.

Preferably, a clearance between the outer peripheral surface of the tubular member and an inner peripheral surface of the ring member is at least a minimum clearance allowing insertion of the ring member into the outer periphery of the tubular member and is less than the maximum clearance between the outer peripheral surface of the tubular member and the inner peripheral surface of the housing.

Preferably, the tubular member and the ring member are formed of stainless steel.

A second aspect of the present invention relates to a method for manufacturing a tubular structure, the method including inserting a ring member into a tubular member and forming an annular protrusion at a part of the tubular member closer to a tube end portion than the ring member.

Effects of the Invention

According to the present invention, a tubular structure and a manufacturing method therefor that allow tube removal to be prevented even in a case where the clearance between a housing and the tubular structure is large and also allow length-direction vibration to be absorbed to some extent can be provided.

BRIEF DESCRIPTION OF THE DRAWINGS

FIG. 5C is picture of the main part of the tubular structure and in which FIG. 5B is partially enlarged.

FIG. 6 is a graph showing the relationship between a release load (kN) and the height of the annular protrusion that a tubular structure according to a comparative example has.

PREFERRED MODE FOR CARRYING OUT THE INVENTION

Hereinafter, an embodiment of the present invention will be described with reference to drawings and the like.

Figure 1:
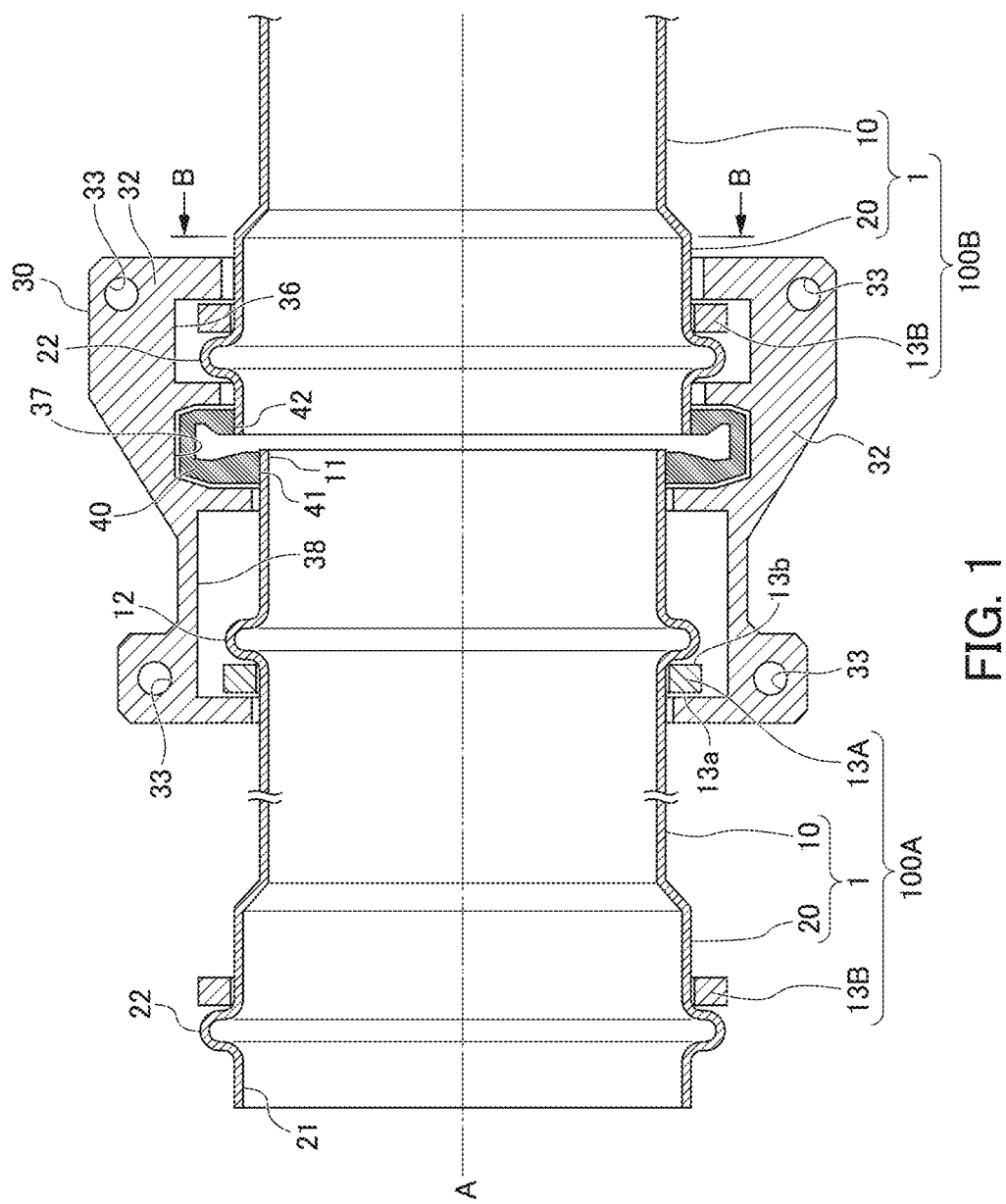
FIG. 1 is a sectional view illustrating a state where two tubular structures according to an embodiment are interconnected by a housing being used.

FIG. 1 is a sectional view illustrating a state where two tubular structures 100 according to the embodiment (100A and 100B) are interconnected by sealing rubber 40 and a housing 30 being used. Although the tubular structure 100 according to the embodiment is used for a pipe jointing part for fluid feeding, the present invention is not limited thereto.
(Tubular Structure)

The tubular structure 100 according to the embodiment is provided with a tubular member 1 and a square ring 13 as a ring member disposed on the outer periphery of the tubular member 1.

(Tubular Member)

A steel pipe made of stainless steel (SUS304) or the like constitutes the tubular member 1. The tubular member 1 has a small diameter portion 10 and a large diameter portion 20 continuously disposed from one end of the small diameter portion 10.

The end portion of the small diameter portion 10 that is on the side which is not continuous to the large diameter portion 20 is an insertion opening 11 connected to the large diameter portion 20 of another tubular member 1. A small diameter side annular protrusion 12 is formed by rolling processing using plastic deformation in the vicinity of an end portion of the insertion opening 11.

The end portion of the large diameter portion 20 that is on the side which is not continuous to the small diameter portion 10 is a receiving opening 21 connected to the insertion opening 11 of another tubular member 1. A large diameter side annular protrusion 22 is formed by rolling processing using plastic deformation in the vicinity of an end portion of the receiving opening 21.

(Square Ring)

The square ring 13 is provided with a small diameter side square ring 13A and a large diameter side square ring 13B. The small diameter side square ring 13A is inserted on the large diameter portion 20 side of the small diameter side annular protrusion 12 (side opposite to the insertion opening 11 as a tube end portion) on the outer periphery of the small diameter portion 10. The large diameter side square ring 13B is inserted on the small diameter portion 10 side of the large diameter side annular protrusion 22 (side opposite to the receiving opening 21 as a tube end portion) on the outer periphery of the large diameter portion 20. In the following description, the small diameter side square ring 13A and the large diameter side square ring 13B will be collectively referred to as the square ring 13 in a case where the small diameter side square ring 13A and the large diameter side square ring 13B do not have to be particularly distinguished from each other.

The material of the square ring 13 is, for example, stainless steel (SUS304). Although the material of the square ring 13 is not limited to stainless steel, it is preferable that the square ring 13 is as hard as or harder than the softer one of the housing 30 and the annular protrusions 12 and 22 (tubular member 1).

If the square ring 13 is softer than the housing 30 and the annular protrusions 12 and 22, the square ring 13 will be plastically deformed when a force is applied in the direction in which the two interconnected tubular structures 100A and 100B are separated from each other. Tube removal blocking performance may not be ensured due to this plastic deformation.

The square ring 13 is an annular member that has a rectangular section. The square ring 13 according to the embodiment is a square ring that is obtained by a line member being curved in a circular shape and end portions thereof being welded. However, the present invention is not limited thereto and the end portions may also be in an unwelded state. The square ring 13 may also be manufactured by punching being performed on a plate member or by cutting of a casting that has a rough shape. The square ring 13 does not necessarily have to be a ring-shaped single-piece object and may also be, for example, a square ring divided into two. In this manner, the square ring 13 can be manufactured with higher accuracy than in a case where the square ring 13 is manufactured by casting.

The square ring 13 has two side surfaces 13a and 13b that are parallel to each other and along a plane perpendicular to an axis A of the tubular member 1. The side surfaces may not be strictly perpendicular to the axis A.

When the thickness of the square ring 13 (distance between the side surface 13a and the side surface 13b) is less than 1 mm, the square ring 13 may be deformed and enter the clearance between the inner peripheral surface of the housing 30 and the inner peripheral surface of the tubular member 1. Accordingly, the square ring 13 preferably has a thickness of at least 1 mm and more preferably has a thickness of at least 2 mm. According to Japan Water Works Association standards (JWWA standards) G113, for example, the tubular structure 100 needs to have an elasticity of approximately plus-minus 1.0% with respect to the pipe length thereof. The square ring 13 is inserted into a groove (described later) in the housing along with the annular protrusion 12. Accordingly, when the square ring 13 is too thick, there is no room for relative movements of the housing 30 and the tubular structure 100. Then, elasticity cannot be ensured. Therefore, the square ring 13 preferably has a thickness of 4 mm or less.

The height (radial-direction width) of the square ring 13 exceeds 2.5 mm, which is the maximum clearance between the inner peripheral surface of the housing 30 (inner peripheral surface of the part other than a groove portion) and the outer peripheral surface of the tubular member 1, and is preferably at least 3 mm.

Preferably, the height of the square ring 13 does not exceed 20 mm, which is the distance between a bottom portion of the groove (described later) formed in the housing 30 and the outer peripheral surface of the tubular member 1.

In the present embodiment, the height of the square ring 13 is 8 mm.

Preferably, the clearance between the inner peripheral surface of the square ring 13 and the outer peripheral surface of the tubular member 1 is at least 0.2 mm, which is the minimum clearance allowing insertion into the outer peripheral surface of the tubular member 1.

Preferably, the clearance between the inner peripheral surface of the square ring 13 and the outer peripheral surface of the tubular member 1 is less than 2.5 mm, which is the maximum clearance of the inner peripheral surface (part other than the groove) of the housing 30.

In the present embodiment, the clearance 30 between the inner peripheral surface of the square ring 13 and the outer peripheral surface of the tubular member 1 is 0.5 mm.

(Sealing Rubber)

The sealing rubber 40 is attached to the outer periphery of the portion where the two tubular structures 100 are interconnected.

The sealing rubber 40 has two inner peripheral surfaces 41 and 42 facing the outer peripheral surface of the tubular member 1 and has a substantially U-shape in the section that illustrated in FIG. 1. However, the present invention is not limited thereto and the shape may also be, for example, an L-shape.

The diameter of the inner peripheral surface 41, which is one of the inner peripheral surfaces 41 and 42, is slightly smaller than the diameter of the outer peripheral surface of the small diameter portion 10, and the inner peripheral surface 41 comes into close contact with the outer peripheral surface of the small diameter portion 10 through elastic deformation once the inner peripheral surface 41 is disposed on the outer peripheral surface of the small diameter portion 10.

The diameter of the other inner peripheral surface 42 is slightly smaller than the diameter of the outer peripheral surface of the large diameter portion 20, and the inner peripheral surface 42 comes into close contact with the outer peripheral surface of the large diameter portion 20 through elastic deformation once the inner peripheral surface 42 is disposed on the outer peripheral surface of the large diameter portion.

(Housing)

The housing 30 is attached to the outer peripheral side of the sealing rubber 40.

Figure 2:
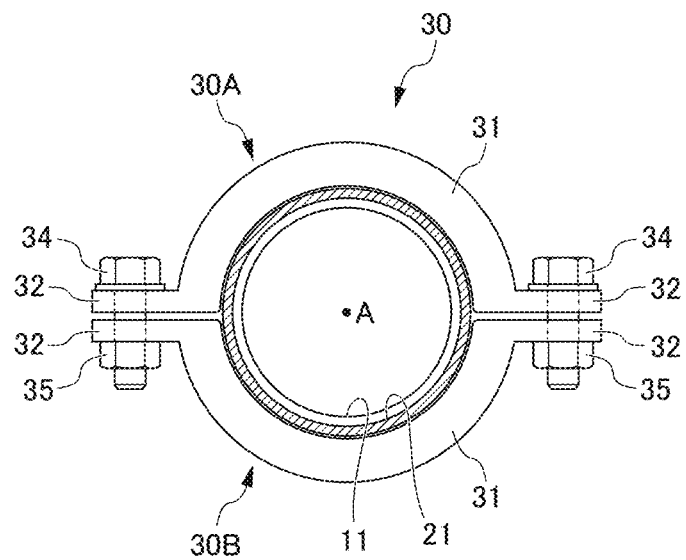
FIG. 2 is a sectional view of the housing, which is seen from the arrow B direction in FIG. 1.

FIG. 2 is a sectional view of the housing 30, which is seen from the arrow B direction in FIG. 1.

In the present embodiment, the housing 30 is manufactured from the cast iron that is defined in Japanese Industrial Standards G 5502 FCD450. The housing 30 is made of cast iron as described above, and thus is larger in dimensional tolerance than the square ring 13, and the maximum clearance between the inner peripheral surface (part where no groove is formed) of the housing 30 and the outer peripheral surface of the tubular member 1 is approximately 2.5 mm.

As illustrated in FIG. 2, the housing 30 is provided with two semicircular members 30A and 30B. Each of the semicircular members 30A and 30B is provided with a semicircular ring portion 31 that is along the outer periphery of the tubular member 1 and two flange portions 32 that extend radially outward from both ends of the semicircular ring portion 31.

A hole 33 is formed in each of the flange portions 32. The holes 33 formed in the flange portion 32 of the semicircular member 30A and the flange portion 32 of the semicircular member 30B allow penetration once the semicircular members 30A and 30B are disposed on the outer periphery of the tubular structure 100 and both flange portions 32 are allowed to face each other.

A bolt 34 is inserted into the hole 33, and a nut 35 is screwed at the tip of the threaded portion of the bolt 34. By tightening of the nut 35, the two semicircular members 30A and 30B cover the outer periphery of the tubular structure 100 and the two tubular structures 100 are interconnected.

As illustrated in FIG. 1, an annular groove 36 covering the outer periphery of the annular protrusion 22 of the receiving opening 21, an annular groove 37 into which the sealing rubber 40 is fitted, and an annular groove 38 covering the annular protrusion 12 of the insertion opening 11 are formed in the inner peripheral surface of the housing 30.

(Method for Manufacturing Tubular Structure)

Figure 3A:
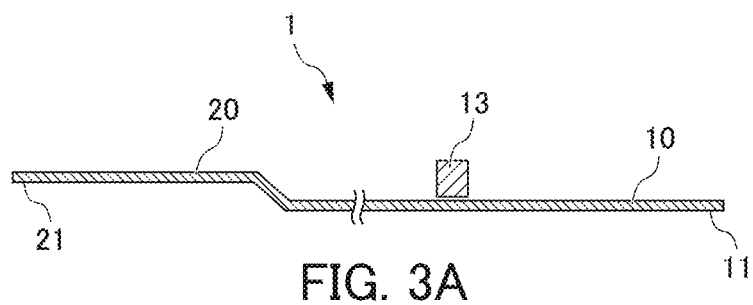
FIG. 3A is a diagram illustrating a method for manufacturing the tubular structure and illustrates a state where a small diameter side annular protrusion is yet to be formed.
Figure 3B:
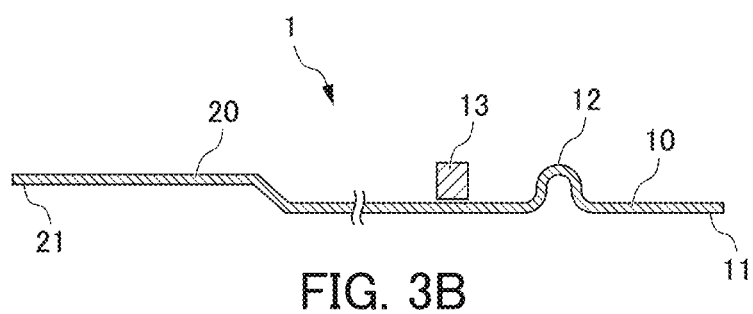
FIG. 3B is a diagram illustrating a method for manufacturing the tubular structure and illustrates a state where the small diameter side annular protrusion is already formed.

FIG. 3A and FIG. 3B are diagrams illustrating a method for manufacturing the tubular structure 100 according to the embodiment. FIG. 3A illustrates a state where the annular protrusion 12 is yet to be formed, and FIG. 3B illustrates a state where the annular protrusion 12 is already formed. FIG. 3A and FIG. 3B illustrate a method for attaching the small diameter side square ring 13A to the small diameter portion 10, which is a part of the method for manufacturing the tubular structure 100. The large diameter side square ring 13B is attached to the large diameter portion 20 by a method similar to the method for attaching the small diameter side square ring 13A to the small diameter portion 10. Accordingly, the two methods will not be distinguished from each other and will be described as a method for attaching the square ring 13 to the tubular member 1 in the following description.

Firstly, the square ring 13 is inserted into the outer periphery of the tubular member 1 in the state of FIG. 3A where the annular protrusion 12 is yet to be formed.

Next, the annular protrusion 12 is manufactured by rolling processing as in FIG. 3B.

Figure 4A:
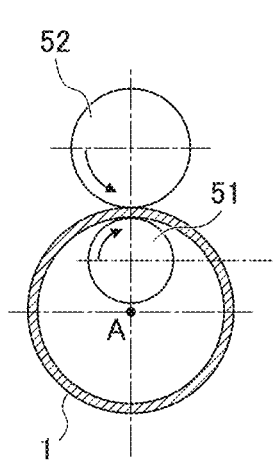
FIG. 4A is a diagram illustrating a rolling processing method and a sectional view of a state prior to rolling processing in the direction that is perpendicular to an axis A of a small diameter portion
Figure 4B:
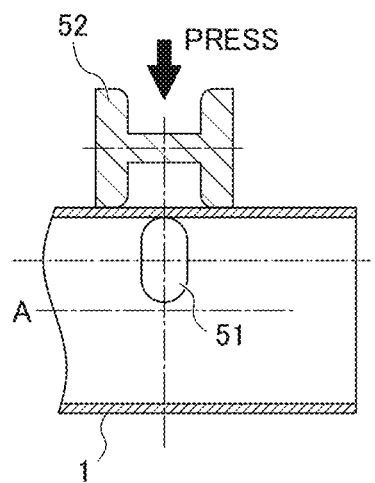
FIG. 4B is a diagram illustrating a rolling processing method and a sectional view along the axis A of the small diameter portion and illustrates a pre-rolling processing state
Figure 4C:
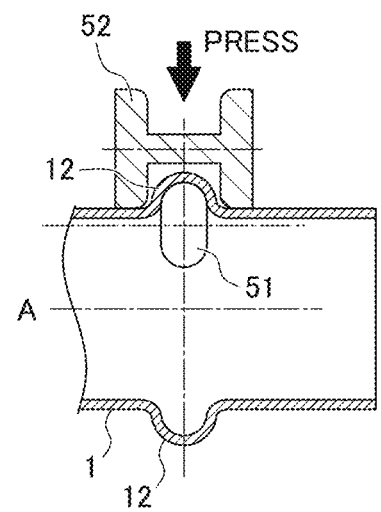
FIG. 4C is a diagram illustrating a rolling processing method and a sectional view along the axis A of the small diameter portion and illustrates a post-rolling processing state.

FIG. 4A, FIG. 4B and FIG. 4C are diagrams illustrating a rolling processing method. FIG. 4A is a sectional view of a state prior to rolling processing in the direction that is perpendicular to the axis A of the tubular member 1. FIG. 4B is a sectional view along the axis A of the tubular member 1 and illustrates a pre-rolling processing state. FIG. 4C is a sectional view along the axis A of the tubular member 1 and illustrates a post-rolling processing state.

A tube end portion (insertion opening 11) of the tubular member 1 is pinched between a convex roller 51 and a concave roller 52 as illustrated in FIG. 4A and FIG. 4B.

Then, one or both of the convex roller 51 and the concave roller 52 are relatively moved in the direction in which the convex roller 51 and the concave roller 52 approach each other. As a result, the part of the small diameter portion 10 that is pinched between the convex roller 51 and the concave roller 52 is deformed.

The convex roller 51 and the concave roller 52 are rotated in this state. Then, the part that is pinched between the convex roller 51 and the concave roller 52 is also moved, and the annular protrusion 12 that is along a circumferential direction is formed on the tubular member 1 as illustrated in FIG. 4C.

In this manner, the tubular structure 100 can be manufactured that is provided with the tubular member 1 having the annular protrusion 12 and the square ring 13 disposed on the side opposite to the tube end portion (insertion opening 11) of the tubular member 1 with respect to the annular protrusion 12.

When a square ring that is divided onto two is used, the square ring can be attached after the annular protrusion 12 is formed.

(Method for Connecting Tubular Structure)

A method for connecting the tubular structure 100 will be described.

Firstly, the sealing rubber 40 is inserted on the connection side, which is either the insertion opening 11 or the receiving opening 21, of one of the two tubular structures 100 scheduled to be interconnected.

Next, the connection side, which is either the insertion opening 11 or the receiving opening 21, of the other tubular structure 100 is inserted into the sealing rubber 40.

The semicircular members 30A and 30B of the housing 30 are disposed on the outer periphery of the tubular structure 100, and the flange portion 32 of the semicircular member 30A and the flange portion 32 of the semicircular member 30B are allowed to face each other.

Then, the bolt 34 is inserted into the holes 33 formed in both flange portions 32, and the nut 35 is screwed at the tip of the threaded portion of the bolt 34.

By tightening of the nut 35, the two semicircular members 30A and 30B cover the outer periphery of the tubular structure 100 and the two tubular structures 100 are interconnected.

Figure 5A:
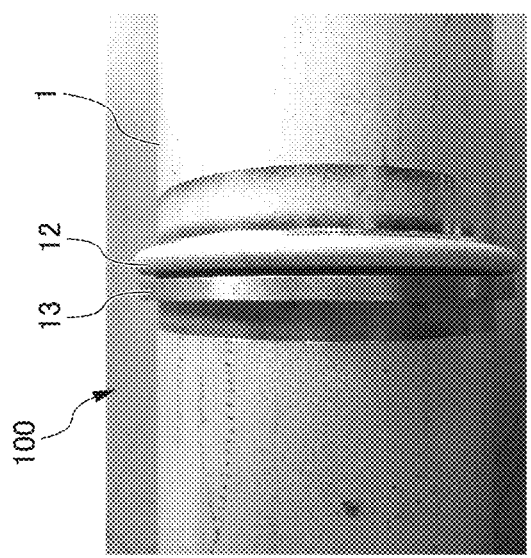
FIG. 5A is picture of the main part of the tubular structure and shows a state where the housing is yet to be attached.
Figure 5B:
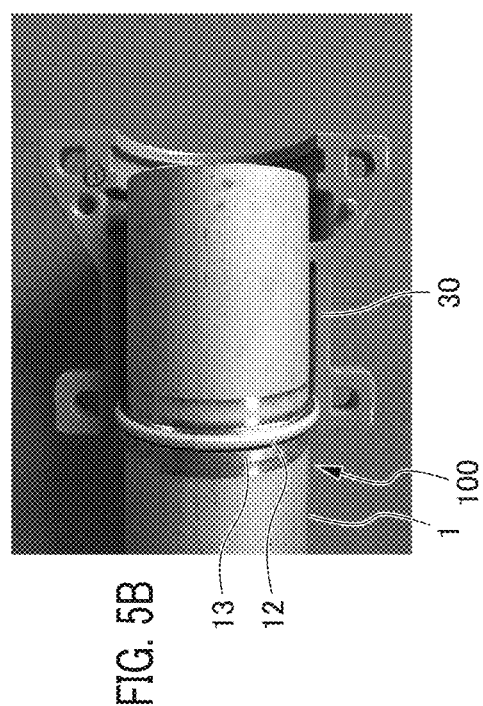
FIG. 5B is picture of the main part of the tubular structure and shows a state where a semicircular member A of the housing is disposed.
Figure 5C:
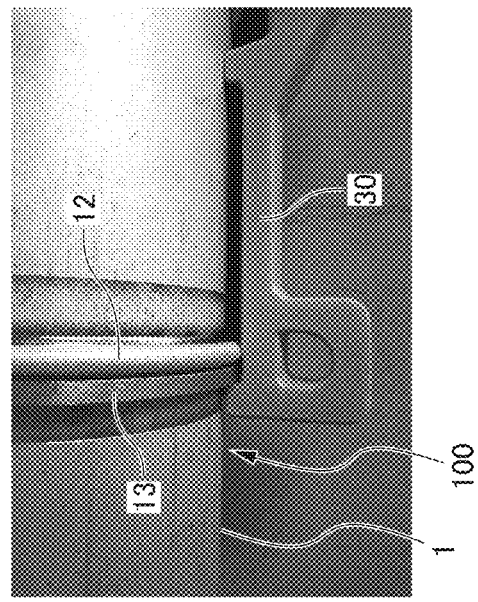

FIG. 5A, FIG. 5B and FIG. 5C are pictures of the main part of the tubular structure 100, FIG. 5A shows a state where the housing 30 is yet to be attached, FIG. 5B shows a state where the semicircular member 30A of the housing 30 is disposed, and FIG. 5C is a picture in which FIG. 5B is partially enlarged.

(Release Load Difference Attributable to Clearance Difference)

Before the effect of the tubular structure 100 according to the embodiment is described, the annular protrusion height-release load relationships that tubular structures according to a comparative example, in which no square ring is attached to the tubular member, have in the following two cases will be described:

(A) Case where the clearance between the outer periphery of the tubular member and the inner periphery of the housing is as small as 1.0 mm on one side;

(B) Case where the clearance between the outer periphery of the tubular member and the inner periphery of the housing is as large as 2.5 mm on one side.

FIG. 6 is a graph showing the relationships between the release load (kN) and the height (mm) of the annular protrusion in the (A) and (B) cases above that the tubular structures according to the comparative example have.]

The tubular member has a nominal diameter of 150A (actual diameter: φ165.2 mm, pipe thickness: 3.5 mm).

The release load is the maximum load that can be borne when a force is applied in the direction in which the two tubular structures are separated from each other in a state where both tubular structures are interconnected by the housing being used.

In the case of nominal diameter 150A, the load that is required as the release load in the case of actual use (required load) is 450 kN.

A required load of 450 kN or less is not preferable in that the two tubular structures are easily removed in a case where, for example, a force is generated in the direction in which the two tubular structures are separated from each other due to an earthquake or the like in a state where the two tubular structures are interconnected.

As illustrated in FIG. 6, the release load is equal to or less than 450 kN, which is the required load, when the annular protrusion is approximately 4.7 mm or less in a case where the clearance is small (1.0 mm on one side). Accordingly, this is not preferable as a product.

The release load is equal to or less than 450 kN, which is the required load, when the annular protrusion is approximately 7 mm or less in a case where the clearance is large (2.5 mm on one side). Accordingly, this is not preferable as a product. In addition, even at the same annular protrusion height, the release load is smaller in the (B) case where the clearance between the outer periphery of the tubular member and the inner periphery of the housing is large (2.5 mm on one side) than in the (A) case where the clearance between the outer periphery of the tubular member and the inner periphery of the housing is small (1.0 mm on one side).

In other words, in a case where a force is generated in the direction in which the two tubular structures are separated from each other with respect to the two interconnected tubular structures according to the comparative example due to an earthquake or the like, the possibility that the two tubular structures are removed even with a small force occurs when the clearance is large and when the annular protrusion is not high to some extent.

Usually, the housing is manufactured by casting. Casting entails a lot of manufacturing variations and results in an increase in clearance in some cases. Accordingly, the tubular structure according to the comparative example will be easily removed unless the annular protrusion is quite high.

However, since the annular protrusion is formed by plastic deformation, an excessive increase in the height of the annular protrusion is not preferable from the viewpoint of ensuring strength.

Effect of Embodiment

The relationship between the height of the annular protrusion 12 and the release load was measured with regard to the tubular structure 100 according to the present embodiment, and the results of the measurement will be described based on Table 1 below. FIG. 7 is a graph showing the results in Table 1.

The following three types were prepared as the tubular member 1 of the tubular structure 100 according to the embodiment.

(a) Nominal diameter 80A (actual diameter: φ89.1 mm, pipe thickness: 3.0 mm) The required load at this time is 240 kN.

(b) Nominal diameter 150A (actual diameter: φ165.2 mm, pipe thickness: 3.5 mm) The required load at this time is 450 kN.

(c) Nominal diameter 250A (actual diameter: φ267.4 mm, pipe thickness: 4.0 mm) The required load at this time is 750 kN.

TABLE 1

|   | Nominal diameter dimension (mm) | Annular protrusion height (mm) | Required load (kN) | Embodiment Width 1.0 mm Large clearance (1) (One side 2.5 mm) Release load (kN) | Pass/fail | Width 2.0 mm (2) Release load (kN) | Pass/fail | Width 2.0 mm Small clearance (3) (One side 1.0 mm) Release load (kN) | Pass/fail | Width 4.0 mm (4) Release load (kN) | Pass/fail | Comparative example Small clearance (5) (One side 1.0 mm) Release load | Pass/fail |
|---|---|---|---|---|---|---|---|---|---|---|---|---|---|
| (a) | 80 (φ 89.1 × t3.0) | 3.5 | 240 | 240 | ○ | 272 | ○ | 293 | ○ | 295 | ○ | 225 | X |
|   |   | 5 |   | 273 |   | 302 |   | 335 |   | 340 |   | 255 | ○ |
|   |   | 6 |   | 291 |   | 325 |   | 361 |   | 365 |   | 275 |   |
|   |   | 7 |   | 275 |   | 303 |   | 340 |   | 344 |   | 260 |   |
|   |   | 10 |   | 260 |   | 285 |   | 320 |   | 325 |   | 245 |   |
|   |   | 12 |   | 242 |   | 276 |   | 298 |   | 300 |   | 230 | X |
| (b) | 150 (φ 165.2 × t3.5) | 4 | 450 | 455 |   | 520 |   | 560 |   | 570 |   | 430 | X |
|   |   | 6 |   | 524 |   | 578 |   | 630 |   | 645 |   | 490 | ○ |
|   |   | 8 |   | 580 |   | 638 |   | 700 |   | 712 |   | 540 |   |
|   |   | 10 |   | 560 |   | 624 |   | 671 |   | 680 |   | 520 |   |
|   |   | 18 |   | 468 |   | 533 |   | 568 |   | 570 |   | 445 | X |
| (c) | 250 (φ 267.4 × t4.0) | 4 | 750 | 753 |   | 855 |   | 920 |   | 925 |   | 710 | X |
|   |   | 6 |   | 801 |   | 913 |   | 990 |   | 995 |   | 760 | ○ |
|   |   | 9 |   | 955 |   | 1092 |   | 1185 |   | 1199 |   | 910 |   |
|   |   | 15 |   | 814 |   | 930 |   | 1001 |   | 1010 |   | 770 |   |
|   |   | 20 |   | 750 |   | 851 |   | 915 |   | 925 |   | 700 | X |

The following four types were prepared as the square rings 13A and 13B. Each of the square rings 13A and 13B has a height of 8 mm.
(1) 1.0 mm in width, large clearance between the outer periphery of the tubular member 1 and the inner periphery of the housing (2.5 mm on one side)
(2) 2.0 mm in width, large clearance between the outer periphery of the tubular member 1 and the inner periphery of the housing (2.5 mm on one side)
(3) 2.0 mm in width, small clearance between the outer periphery of the tubular member 1 and the inner periphery of the housing (1.0 mm on one side)
(4) 4.0 mm in width, small clearance between the outer periphery of the tubular member 1 and the inner periphery of the housing (1.0 mm on one side)
(5) In addition, the tubular structure that uses no square ring was also prepared as the comparative example.

Prepared as the height of the annular protrusion 12 disposed on the tubular member 1 were six types (3.5, 5, 6, 7, 10, and 12 mm) in the case of nominal diameter 80A, five types (4, 6, 8, 10, and 18 mm) in the case of nominal diameter 150A, and five types (4, 6, 9, 15, and 20 mm) in the case of nominal diameter 250A.

Figure 7A:
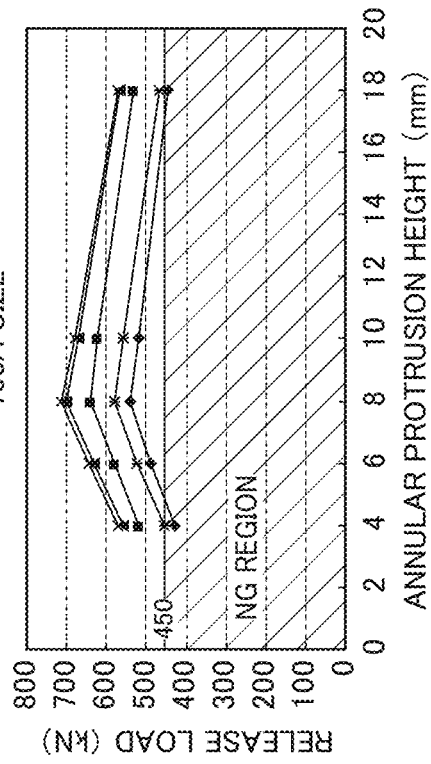
FIG. 7A is a graph showing the results of an experiment regarding the tubular structure according to the present embodiment of nominal diameter 80A.

Result of Experiment (a) Case of Nominal Diameter 80A (FIG. 7A)

Comparative Example

The tubular structures according to Comparative example (5) using no square ring reached a maximum load of 225 kN when the two tubular structures were pulled in the direction in which the tubular structures are separated from each other in the case of small clearance (1.0 mm on one side) and 3.5 mm in annular protrusion height. This is considered to be because the annular protrusion was too low and the housing climbed over the annular protrusion.

In the case of 12 mm in annular protrusion height, the maximum load reached 230 kN when the two tubular structures were pulled in the direction in which the tubular structures are separated from each other. This is considered to be because the high annular protrusion led to a decline in strength attributable to an increase in plate thickness decrease and the annular protrusion was deformed by the housing.

Embodiment

When it comes to (1) to (4) of the embodiment, the release load was at least a required load of 240 kN in any case (not only in the case of small clearance (1.0 mm on one side) but also in the case of large clearance (2.5 mm on one side)).

Figure 7B:
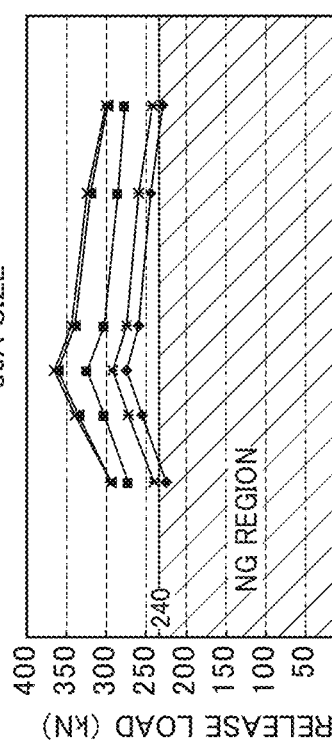
FIG. 7B is a graph showing the results of an experiment regarding the tubular structure according to the present embodiment of nominal diameter 150A.

(b) Case of Nominal Diameter 150A (FIG. 7B)

Comparative Example

The tubular structures according to Comparative example (5) using no square ring reached a maximum load of 430 kN when the two tubular structures were pulled in the direction in which the tubular structures are separated from each other in the case of small clearance (1.0 mm on one side) and in the case of 4 mm in annular protrusion height. This is considered to be because the annular protrusion was too low and the housing climbed over the annular protrusion.

In the case of 18 mm in annular protrusion height, the maximum load reached 445 kN when the two tubular structures were pulled in the direction in which the tubular structures are separated from each other. This is considered to be because the high annular protrusion led to a decline in strength attributable to an increase in plate thickness decrease and the annular protrusion was deformed by the housing.

Embodiment

When it comes to (1) to (4) of the embodiment, the release load was at least a required load of 450 kN in any case (not only in the case of small clearance (1.0 mm on one side) but also in the case of large clearance (2.5 mm on one side)).

Figure 7C:
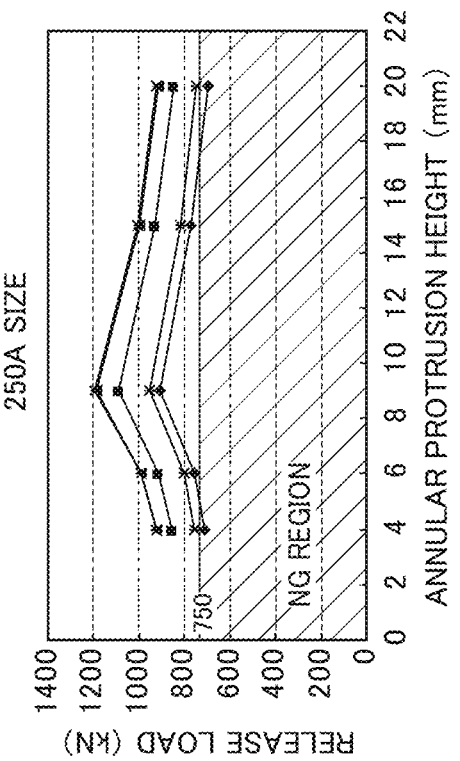
FIG. 7C is a graph showing the results of an experiment regarding the tubular structure according to the present embodiment of nominal diameter 250A.

(c) Case of Nominal Diameter 250A (FIG. 7C)

Comparative Example

The tubular structures according to Comparative example (5) using no square ring reached a maximum load of 710 kN when the two tubular structures were pulled in the direction in which the tubular structures are separated from each other in the case of small clearance (1.0 mm on one side) and in the case of 4 mm in annular protrusion height. This is considered to be because the annular protrusion was too low and the housing climbed over the annular protrusion.

In the case of 20 mm in annular protrusion height, the maximum load reached 700 kN when the two tubular structures were pulled in the direction in which the tubular structures are separated from each other. This is considered to be because the high annular protrusion led to a decline in strength attributable to an increase in plate thickness decrease and the annular protrusion was deformed by the housing.

Embodiment

When it comes to (1) to (4) of the embodiment, the release load was at least a required load of 750 kN in any case (not only in the case of small clearance (1.0 mm on one side) but also in the case of large clearance (2.5 mm on one side)).

(1) As described above, with the tubular structure 100 according to the present embodiment, the release load becomes larger than in a case where the square rings 13A and 13B are not disposed and tube removal is unlikely to occur.

(Reason)

The annular protrusions 12 and 22 are formed to be pinched between the two rollers 51 and 52, and thus have curved upper portions. Accordingly, the upper portions of the side surfaces of the annular protrusions 12 and 22 are not in contact with the inside surface of the housing 30 and do not contribute to tube removal prevention.

In the comparative example, the area of contact between the annular protrusions 12 and 22 and the inside surface of the housing 30 decreases once the clearance between the housing 30 and the outer peripheral surface of the tubular member 1 becomes large due to the manufacturing error of the housing 30. Then, the annular protrusions 12 and 22 easily enter the inner peripheral side of the housing 30 when a force is applied in the direction in which the tubular structures 100 are separated from each other with respect to the two tubular structures 100 interconnected by the housing 30.

In the present embodiment, however, the square rings 13A and 13B are attached.

The square rings 13A and 13B have a rectangular section and have the two side surfaces 13a and 13b that are along a plane perpendicular to the axis of the tubular member 1.

The square rings 13A and 13B are manufactured more accurately than the housing 30. Accordingly, no variation occurs in the area of contact with the side surfaces of the annular protrusions 12 and 22 perpendicular to the axis A and the area of contact can be reliably maintained.

The side surfaces of the square rings 13A and 13B that are on the housing 30 side are also surfaces perpendicular to the axis A of the tubular member 1. The upper portions of the side surfaces of the square rings 13A and 13B are not curved whereas the upper portions of the annular protrusions 12 and 22 are curved. Accordingly, the upper portions of the side surfaces of the annular protrusions 12 and 22 are capable of ensuring the area of contact between the inside surface of the housing 30 and the side surfaces of the square rings 13A and 13B even when the clearance between the housing 30 and the side surface of the tubular member 1 becomes large due to the manufacturing error of the housing 30. Therefore, tube removal can be prevented.

(2) According to the present embodiment, the square rings 13A and 13B are disposed adjacent to the annular protrusions 12 and 22. The annular protrusions 12 and 22 are made by rolling, and thus the hardness of the annular protrusions 12 and 22 is improved by work hardening in comparison to the other parts of the tubular member 1. In addition, the square rings 13A and 13B are disposed adjacent to the annular protrusions 12 and 22. Accordingly, the release load can be further raised by synergy with Reason (1) above.

(3) The square rings 13A and 13B are not welded to the side surface of the tubular member 1 and are capable of moving in the axis A direction with respect to the tubular member 1. Accordingly, the length-direction vibration of the tubular structure 100 can also be absorbed to some extent. Therefore, tube removal can be prevented even in a case where shaking occurs due to an earthquake or the like.

The present invention is not limited to the embodiment described above. For example, according to the above description, the annular protrusions and the square rings 13A and 13B are disposed on both sides, that is, the insertion opening 11 side and the receiving opening 21 side, of the tubular structure 100 according to the embodiment. However, the present invention is not limited thereto and, for example, the annular protrusion and the square rings 13A and 13B may be disposed at the insertion opening 11 with the square rings 13A and 13B welded to the tubular member 1 without the annular protrusion being disposed at the receiving opening.

EXPLANATION OF REFERENCE NUMERALS

1 Tubular member
10 Small diameter portion
11 Insertion opening
12 Small diameter side annular protrusion
13 Square ring
13a Side surface
13b Side surface
22 Large diameter side annular protrusion
22 Annular protrusion
23 Large diameter side square ring
23a Side surface
23b Side surface
30 Housing
36 Annular groove
37 Annular groove
38 Annular groove
40 Sealing rubber
41 Inner peripheral surface
42 Inner peripheral surface
100, 100A, 100B Tubular structure

The invention claimed is:

1. A tubular structure comprising:
a tubular member provided with an annular protrusion on each of both tube end portions; and
corresponding ring members disposed respectively on a side opposite to each corresponding tube end portion with respect to the corresponding annular protrusion on an outer periphery of the tubular member, each ring member having two side surfaces perpendicular to an axis of the tubular member,
wherein one of the tube end portions of the tubular member is an insertion opening and the other tube end portion of the tubular member is a receiving opening larger in diameter than the insertion opening,
wherein the annular protrusion and the ring member are disposed on at least one side of the insertion opening and the receiving opening,
wherein the tubular structure is connectable by a housing having, in an inner peripheral surface thereof, a respective groove into which each annular protrusion is inserted,
wherein the ring members are manufactured more accurately than the housing,
wherein one of the two side surfaces of each ring member that are perpendicular to the axis of the tubular member is directly contactable with a side surface of the annular protrusion, the side surface of the annular protrusion being perpendicular to the axis of the tubular member, and
wherein the other of the two side surfaces of each ring member that are perpendicular to the axis of the tubular member is directly contactable with the inner peripheral surface of the housing.

2. The tubular structure according to claim 1,
wherein a height of the ring member that corresponds to its width in radial direction
exceeds a maximum clearance between an outer peripheral surface of the tubular member and the inner peripheral surface of the housing at a part of the other than said groove and
is less than a distance between the outer peripheral surface of the tubular member and a bottom surface of the groove.

3. The tubular structure according to claim 2,
wherein a clearance between the outer peripheral surface of the tubular member and an inner peripheral surface of the ring member
is at least a minimum clearance allowing insertion of the ring member into the outer periphery of the tubular member, and
is less than the maximum clearance between the outer peripheral surface of the tubular member and the inner peripheral surface of the housing.

4. The tubular structure according to claim 1,
wherein the tubular member and the ring member are formed of stainless steel.

* * * * *